Patented July 10, 1951

2,560,042

UNITED STATES PATENT OFFICE 2,560,042

PREPARATION OF BUTYLTIN CHLORIDES

Kenneth C. Eberly, George E. P. Smith, Jr., and Harry E. Albert, Akron, Ohio, assignors to The Firestone Tire & Rubber Company, Akron, Ohio, a corporation of Ohio No Drawing. Application June 8, 1949, Serial No. 97,916

7 Claims. (Cl. 260—429)

This invention relates to the preparation of an alkyltin trihalide, a dialkyltin dihalide or trialkyltin halide, and, more particularly, to the preparation of tributyltin chloride and dibutyltin dichloride.

In producing dibutyltin dichloride by the Grignard and other reactions, it has been found that the reaction product generally contains more or less chlorine than the dichloride and consists of a mixture of two or more of the following: monobutyltin trichloride, dibutyltin dichloride, tributyltin chloride and tetrabutyltin. Likewise, in producing tributyltin chloride the reaction product similarly contains more or less than the desired amount of chlorine. According to this invention, dibutyltin dichloride, for example, is readily obtained from such a reaction mixture by (1) determining the composition of the reaction mixture, and (2) adding to the mixture and reacting with it the amount of stannic chloride, monobutyltin trichloride, tributyltin chloride, tetrabutyltin, or mixture of these of higher or lower chlorine content than dibutyltin dichloride, which is required to produce the dibutyltin dichloride. The composition of the reaction mixture may be determined by analysis for chlorine or tin, titrating with standard alkali to phenolphthalein, determination of the specific gravity, etc.

According to this invention the same procedure is followed in preparing other alkyltin halides in which the halogen may be chlorine, bromine or iodine, and the alkyl groups may contain one to twenty carbon atoms, such as methyl, propyl, hexyl, decyl, dodecyl, octadecyl, etc., and may be straight chain, branched chain or cycloalkyl, such as cyclopentyl, cyclohexyl, etc. Any one compound may contain two or more different halogens and two or more different alkyl groups.

Assume, for example, that the desired compound has the formula

in which $m$ is 1, 2 or 3. The process of the invention presupposes that there is at least fifty per cent of this desired product in the reaction mixture. If it is contaminated with a compound or mixture of compounds which contain less than the desired number of alkyl groups, this contaminant has the general formula

in which $x$ has a value from 0 to less than $m$. Thus if dialkyltin dihalide is desired, $m$ in the formula for the desired compound is 2, and if the contaminating material has a deficiency of alkyl groups $x$ has a value of 0 to less than 2. To correct this situation, this invention provides for reacting the contaminated product with a compound or mixture of compounds having the formula

in which $y$ is greater than $m$ but no more than 4.

Conversely, if the desired product is contaminated with a compound or mixture of compounds containing an excess of alkyl groups, the contaminant is represented by the formula

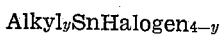

in which $y$ is greater than $m$ but no more than 4. To correct this situation there is added a compound or mixture of compounds having the formula

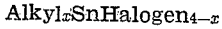

in which $x$ has a value from 0 to less than $m$.

Thus the general reaction may be illustrated by the equation which includes $Alkyl_xSnHalogen_{4-x}$ which is the product desired and present in the reaction mixture:

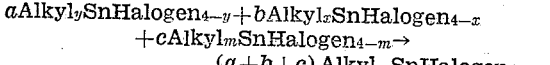

Thus, to produce dialkyltin dichloride from a reaction mixture containing over fifty per cent of the desired product, if the contaminant is alkyltin trichloride, we have

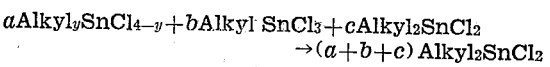

In this case, if the reagent used to correct the situation is trialkyltin chloride, it will be used in the same molecular proportion as the contaminant, i. e. $a=b$. Conversely, if the contaminant is trialkyltin chloride, an equal amount of alkyltin trichloride will be used to correct the situation. Generally the purifying agent will be either $Alkyl_4Sn$ or $SnHalogen_4$. If a mixture of purifying agents is employed it may be necessary to express the alkyl and chlorine contents of the reagent used to convert the contaminant to the desired product in fractions.

The following examples relate to the purification of Grignard reaction products or the like. The starting product may be a mixture of alkyltin halides similar to those obtained from Grignard reactions, whatever the source of the mixture.

EXAMPLE 1

*Tributyltin chloride*

A Grignard reaction was carried out with 28 grams (1.15 gram-moles) of magnesium, 500 ml. of dry ether and 1–2 cc. of butyl iodide (to start the reaction) and then 106.5 grams (1.15 gram-moles) of butyl chloride added at such a rate that the reaction did not become violent. This occupied about two hours. After stirring for an additional two hours nearly all of the magnesium had dissolved. At this point the Grignard reagent was removed from the flask and placed in a separatory funnel. A mixture of 130.5 grams (0.5 gram-mole) of anhydrous stannic chloride and 500 ml. of dry benzene were placed in a 3-liter flask fitted with a stirrer. The Grignard reagent was then slowly added to the stannic chloride solution with stirring and cooling. A violent reaction took place, so that half an hour to an hour was consumed in adding the Grignard reagent. The reaction mixture was then treated with 500 ml. of a 30-gram-per-liter aqueous ammonium chloride solution, with stirring. The whole was poured into a separatory funnel, and the aqueous layer was removed and rejected. The organic layer was washed with a second 500 ml. of ammonium chloride solution, separated and distilled to remove the ether and benzene. There was obtained 86.8 grams of a light brown oil with a specific gravity of 1.179 at 50° C. Exactly 1.0000 gram of this oil was titrated in aqueous ethanol with phenolphthalein indicator. Exactly 31.35 ml. of 0.1000N sodium hydroxide solution were consumed. One gram of pure tributyltin chloride titrates 30.73 ml. of 0.1000 N sodium hydroxide solution while one gram of pure dibutyltin dichloride titrates 65.84 ml. of 0.1000 N sodium hydroxide solution. From these figures it is easily calculated that the brown oil contained 1.77 per cent dibutyltin dichloride, the rest being tributyltin chloride. It is further easily calculated that 1.74 grams of tetrabutyltin should be reacted with 85.9 grams of the brown oil containing 1.77 per cent dibutyltin dichloride. Exactly 1.8 grams of tetrabutyltin were added to 85.9 grams of the brown oil containing 1.77 per cent dibutyltin dichloride, and the whole was refluxed for two hours. The reaction mixture became dark because of a slight amount of precipitated tin. The whole was filtered and distilled in vacuum (110–120° C./3–4 mm. with some decomposition) to yield 82.1 grams of a colorless liquid which titrated 30.8 ml. of 0.1000 N sodium hydroxide per gram. The liquid was fairly pure tributyltin chloride.

EXAMPLE 2

Dibutyltin dichloride

A Grignard reaction was carried out with 28 grams (1.15 gram-moles) of magnesium, 500 ml. of dry ether and 1–2 cc. butyl iodide (to start the reaction), and then 106.5 grams (1.15 gram-moles) of dry butyl chloride were added at such a rate that no violent reaction took place. This required about two hours. The whole was stirred for a further two hours, at which time nearly all of the magnesium was dissolved. The Grignard reagent was transferred to a dropping funnel and then added dropwise during one hour with vigorous stirring to a mixture of 208.4 grams (0.8 gram-mole) of stannic chloride in 800 ml. of dry benzene. A vigorous reaction took place. The reaction mixture was washed twice with two 700 ml. portions of 30-gram-per-liter aqueous ammonium chloride solution. The organic layer was separated. On filtering there resulted 135.0 grams of a brownish oil. Exactly 1.000 gram of this oil titrated 60.1 ml. of 0.1000 N sodium hydroxide. Since dibutyltin dichloride titrates 65.84 ml. of 0.1000 N sodium hydroxide solution and tributyltin chloride titrates 30.73 ml. of 1.000 N sodium hydroxide solution, it was easily calculated that there were 16.33 per cent tributyltin chloride and 83.67 per cent dibutyltin dichloride in the mixture. It was further easily calculated that 8.76 grams of stannic chloride are necessary to convert the 16.33 per cent of tributyltin chloride in the 134.0 grams of the brownish oil to dibutyltin dichloride. Eight and eight-tenths grams of stannic chloride were, therefore, refluxed for two hours with 134 grams of the brownish oil. The reaction mixture developed some slightly gray sludge (deposited tin) which was filtered off after the reaction was completed. Vacuum distillation gave 130.4 grams of product boiling at 140–143° C. at 10 mm. This material titrated 66.16 ml. of 0.1000 N sodium hydroxide solution per gram. The distillate congealed to a crystalline solid sometime after distillation. The pressed crystals melted at 42° C. (as compared with a melting point of 43° C. for pure dibutyltin dichloride reported by Pfeiffer, Z. Anorg. Chem. 68, 102–122 (1910)).

What we claim is:
1. The process represented by the following equation:

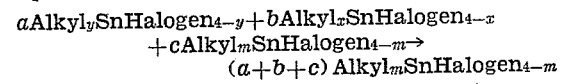

which comprises analyzing a mixture of two of the reactants containing at least fifty per cent by weight of $Alkyl_m SnHalogen_{4-m}$ so that the amount of alkyl and halogen present are known, and then adding and reacting therewith the third reactant as indicated in the equation and thereby obtaining substantially pure

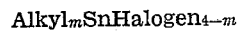

when $x$ and $y$ are each 0 to 4, $m$ is a whole number greater than 0 and less than 4, and $a$ and $b$ are each larger than zero but each is less than $c$.

2. The process of claim 1 in which the subscript of the alkyl group in the added reactant is zero.
3. The process of claim 1 in which the subscript of the halogen group in the added reactant is zero.
4. The process of claim 1 in which $m$ is 2 and the subscript of the alkyl group in the added reactant is zero.
5. The process of claim 1 in which $m$ is 2 and the subscript of the halogen group in the added reactant is zero.
6. The process of claim 1 in which $m$ is 3 and the subscript of the alkyl group in the added reactant is zero.
7. The process of claim 1 in which $m$ is 3 and the subscript of the halogen group in the added reactant is zero.

KENNETH C. EBERLY.
GEORGE E. P. SMITH, Jr.
HARRY E. ALBERT.

REFERENCES CITED

The following references are of record in the file of this patent:

Kozeschkow: Ber. 66B, pages 1661–1665 (1933).